United States Patent
Tang et al.

(10) Patent No.: US 7,587,544 B2
(45) Date of Patent: Sep. 8, 2009

(54) EXTENDING SECURE DIGITAL INPUT OUTPUT CAPABILITY ON A CONTROLLER BUS

(75) Inventors: Xinyue Tang, Shanghai (CN); Qinwei Gu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 11/527,157

(22) Filed: Sep. 26, 2006

(65) Prior Publication Data

US 2008/0077722 A1 Mar. 27, 2008

(51) Int. Cl.
- G06F 13/24 (2006.01)
- G06F 3/00 (2006.01)
- G06F 5/00 (2006.01)
- H05K 7/10 (2006.01)

(52) U.S. Cl. .................. 710/260; 710/49; 710/262; 710/301

(58) Field of Classification Search .......... 710/49, 710/260, 262, 301
See application file for complete search history.

(56) References Cited

U.S. PATENT DOCUMENTS

| | | | | |
|---|---|---|---|---|
| 5,673,400 A | * | 9/1997 | Kenny | 710/306 |
| 5,745,771 A | * | 4/1998 | Ohyama et al. | 710/262 |
| 5,872,959 A | * | 2/1999 | Nguyen et al. | 713/401 |
| 5,943,500 A | * | 8/1999 | Maguire et al. | 710/260 |
| 6,021,425 A | * | 2/2000 | Waldron et al. | 718/103 |
| 6,735,655 B1 | * | 5/2004 | Chilton | 710/262 |
| 6,952,749 B2 | * | 10/2005 | Kim | 710/260 |
| 7,146,440 B1 | * | 12/2006 | Wilson | 710/62 |
| 7,197,583 B2 | * | 3/2007 | Takinosawa et al. | 710/62 |
| 7,269,669 B2 | * | 9/2007 | Liu et al. | 710/8 |
| 2004/0225796 A1 | * | 11/2004 | Hanson et al. | 710/301 |
| 2005/0021894 A1 | * | 1/2005 | Traynor et al. | 710/262 |
| 2005/0160223 A1 | * | 7/2005 | Chen et al. | 711/115 |
| 2006/0010277 A1 | * | 1/2006 | Arndt et al. | 710/305 |

FOREIGN PATENT DOCUMENTS

| | | | |
|---|---|---|---|
| JP | 54064440 A | * | 5/1979 |
| JP | 10116201 A | * | 5/1998 |
| JP | 2001084152 A | * | 3/2001 |

OTHER PUBLICATIONS

Savvopoulos et al., "Prototyping and Testing of the Secure Digital Interface", May 8, 2006, IBM Research Laborator, Zurich, Switzerland, pp. 1-5.*

"SD Host Controller Data Sheet", Eureka Technology, pp. 1-2, retrieved from the Internet on 6/24/09 at http://www.altera.com/products/ip/ampp/documents/m-eur-ep550a.pdf.*

Ott, Leonard, "Designing for SDIO", Wireless Design & Development, pp. 1-3, retrieved from the Internet on Jun. 24, 2009 at http://www.wirelessdesignmag.com/ShowPR.aspx?PUBCODE=055&ACCT=0000100&ISSUE=0407&RELTYPE=PR&PRODCODE=00000&PRODLETT=I&CommonCount=0.*

* cited by examiner

*Primary Examiner*—Mark Rinehart
*Assistant Examiner*—Faisal M Zaman
(74) *Attorney, Agent, or Firm*—Lee & Hayes, PLLC (57) ABSTRACT

Embodiments of techniques for simultaneously connecting a plurality of expansion cards to a single bus of a host controller are described.

10 Claims, 6 Drawing Sheets

EXTENDING SECURE DIGITAL INPUT OUTPUT CAPABILITY ON A CONTROLLER BUS

BACKGROUND

The prevalence of computing devices is ever increasing. For example, users may use a wide range of devices, such as desktop personal computers, laptop computers, personal digital assistants (PDAs), wireless phones, game consoles, and so on. Further, new technology is continually being developed which allows these devices to be expanded such as with increased memory and/or added capabilities such as wireless interfaces, digital cameras, global positioning satellite (GPS) devices and so forth. For instance, a user may use one or more expansion slots of a device and/or expansion cards to add to the capability of a device.

At the same time, the demand for increasingly compact mobile devices is also increasing. However, the ability of computing devices and in particular compact devices to be expanded to provide emerging functionality may be hindered by the size of the device, the number of supported expansion cards, and/or the interactions of simultaneously connected expansion cards.

BRIEF DESCRIPTION OF THE DRAWINGS

The same reference numbers are utilized in instances in the discussion to reference like structures and components.

DETAILED DESCRIPTION

In the following discussion, exemplary devices and techniques are described which may be employed to simultaneously connect a plurality of expansion cards (e.g., memory and input/output devices) to a host device via a single bus of a host controller. In particular, inventive circuits and procedures are described which are operable to simultaneously connect a host device to and switch between a plurality of secure digital (SD) cards including both SD memory and/or secure digital input output (SDIO) devices. SD cards, SD memory and SDIO devices may be configured in accordance with one or more technical and specification standards established by the SD Card Association (SDA). In one or more described embodiments, an interrupt isolation portion is provided to prevent interrupt signals employed with the SDIO devices from polluting transfers occurring via an active (selected) SD card. A variety of suitable techniques may be utilized to isolate the interrupt signal of SDIO devices examples of which are provided below.

Exemplary Environment

Figure 1:
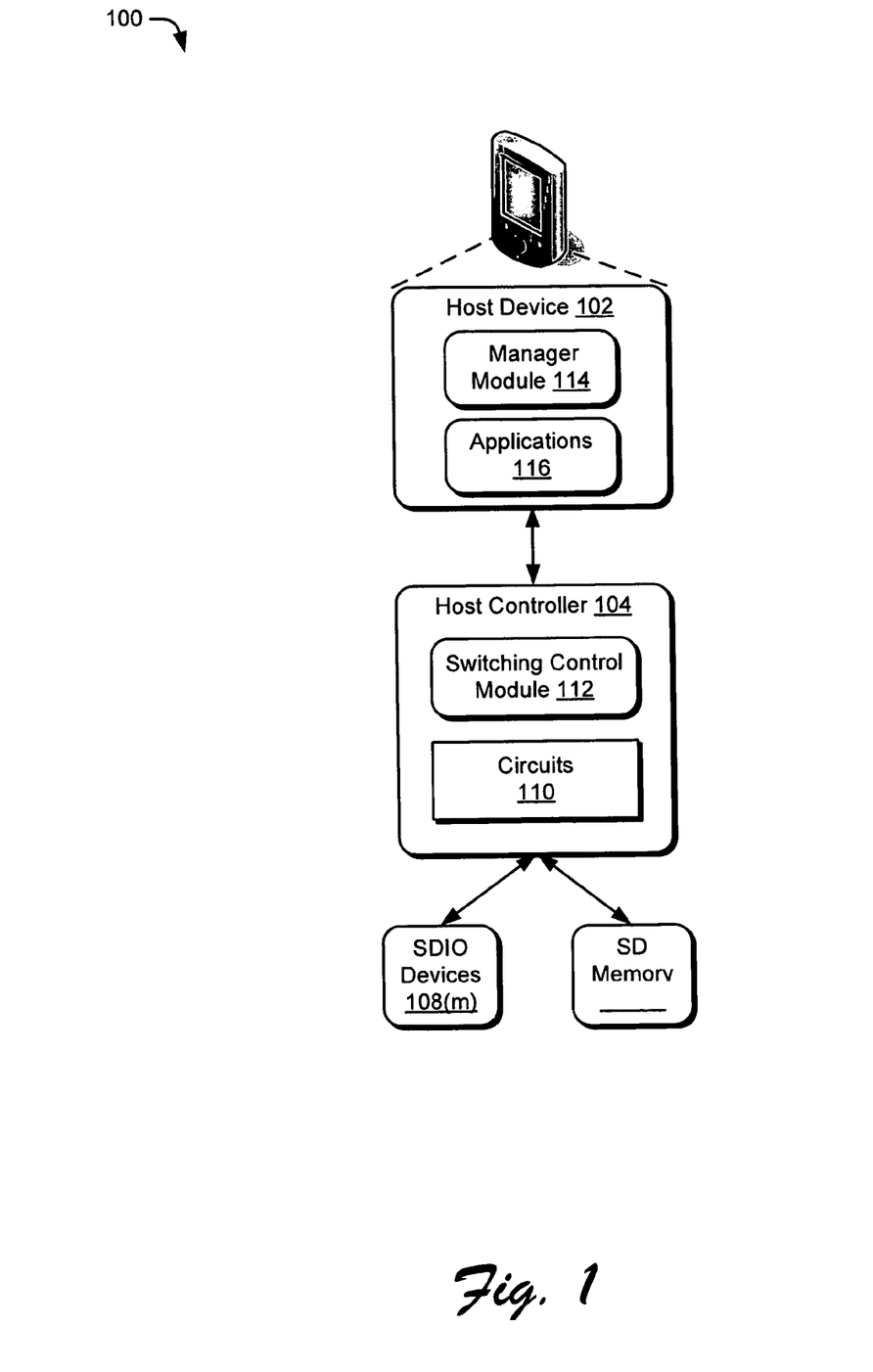
FIG. 1 is an illustration of an exemplary implementation of environment in which host controller circuits operable to simultaneously connect a plurality of expansion cards may be employed.

FIG. 1 depicts an exemplary implementation of an environment 100 in which the described circuits and techniques may be employed. A host device 102 is depicted which is operably coupled to a host controller 104. While host controller 104 is depicted separately from the host device 102 it is contemplated that the host controller 104 may be implemented internal or external to the host device 102, may be integrated with the host device 102, and so forth. A variety of host devices 102 are contemplated including computing devices such as a general purpose computing devices, handheld devices, personal digital assistants (PDA), mobile phone, multimedia devices, game consoles, as well as a variety of other devices including but not limited to printers, fax machines, digital cameras, digital video recorders, televisions, monitors, and so forth.

Host controller 104 represents functionality to provide the host device 102 with an interface to and operable control of a plurality of expansion cards. In an implementation, a host controller 104 is configured to provide an interface to at least a plurality of secure digital (SD) cards which may include one or more SD memory cards 106(n) and one or more SDIO devices 108(m) where "n" and "m" may be any integer. Host controller 104 is depicted as including one or more circuits 110 which provide connection of the cards to the controller 104. For example, circuits 110 may correspond to a plurality of slots and/or connectors configured to receive expansion cards (for example, a plurality of SD cards). A switching control module 112 is illustrated which represents functionality operable to switch between operation of connected cards, e.g., to select and deselect cards.

Host device 102 is further depicted as including a manager module 114 which may be configured to manage a variety of expansion devices of the host device 102, including those associated with the host controller 104. Manager module 114 may encompass logic, devices, software (drivers), hardware, and combinations thereof to manage a plurality of peripheral and expansion devices, interactions between the host device 102 and a host controller 104 (as well as other controllers), and accordingly to provide access to the associated expansion devices, such as connected SD cards.

FIG. 1 further depicts a variety of applications 116 executable on a host device 106 to provide a variety of functionality including interactions with connected SD cards and associated data via the host controller 104. Applications 116 may be configured to provide a variety of functionality to a host device 102 including such as office productivity (word processing, spreadsheets, presentations); multimedia (e.g., photo, video, audio, editing and management); communications (e.g., email, instant messaging, text messaging and the like), internet content (e.g., a browser); card management; and so on. Thus, manager module 114 may provide functionality for applications 116 executing on a host device 102 to interact with SD memory 106(n) and SDIO devices 108(m) connected via host controller 104 and associated data.

Figure 2:
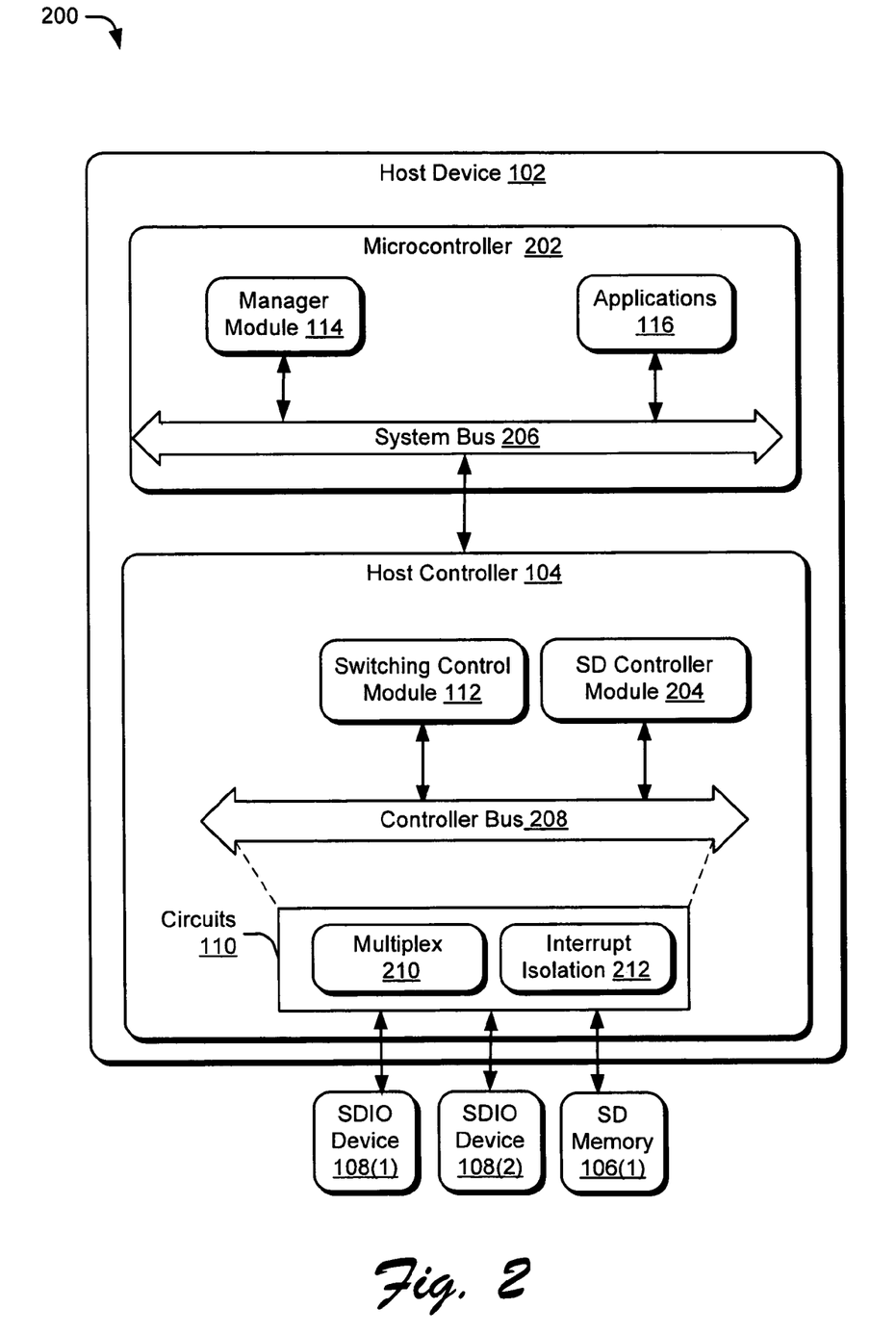
FIG. 2 is illustration depicting a system in an exemplary implementation that shows the host device and controller of FIG. 1 in greater detail.

FIG. 2 depicts an exemplary implementation of a system 200 showing the host controller 104 and host device 102 of FIG. 1 in greater detail. In FIG. 2, the host controller 104 is illustrated as integrated with the host device 102, e.g., an internal host controller 104. Embodiments of an external host controller 104 are also contemplated, such as associated with an external card reader device. The host device 102 is further depicted as including a microcontroller unit (MCU) 202, which may integrate a variety of computing functionality for the host device 102, such as on a common chip or circuit board. Thus, microcontroller unit 202 represents an integrated circuit which may integrate a central processing unit (CPU), input/output (I/O) interfaces, memory, and so forth. This integration may reduce the amount of wiring and space compared to a typical arrangement of a general purpose computing device which employs a variety of separate chips. Likewise, the host controller 104 may be an integrated circuit which incorporates a processor, input/output (I/O) interfaces, memory, and so forth.

The microcontroller 202, and host controller 104 may be configured in a variety of ways, and thus, are not limited by the materials from which they may be formed or the processing mechanisms employed therein. For example, the controllers may be comprised of semiconductor(s) and/or transistors (e.g., electronic integrated circuits (ICs)), and so on. Each may also include respective memory which may be configured as "main memory" of the host device, dynamic random access memory (DRAM), persistent storage (e.g., a hard disk drive), removable computer-readable media (e.g., a digital video disc (DVD)), as well as other types of memory and computer readable media. A variety of other implementations are also contemplated.

In an implementation, the host controller 104 may also be integrated within the MCU 202, such as integrated on a single chip or board. The host controller 104 may operate directly with components of the MCU 202 for example directly interacting with a processor and memory integrated with the MCU 202 and thus, the host controller 104 may or may not be implemented with a separate processor and memory. The host controller is depicted as incorporating a secure digital (SD) controller 204 module which provide functionality for the operation and management of secure digital cards including SD memory 106(*m*) and SDIO devices 108(*n*). Secure digital (SD) controller 204 module may be provided as an integrated portion of host controller 104 or as a separate controller for SD cards.

The system bus 206 (e.g., host bus) communicatively couples (e.g. interconnects) the components of system 200. For instance the system bus 206 may couple the MCU 202 to the host controller 104. The system bus 206 may also interconnect a variety of other components (not shown) such as a display, input devices, speakers and so forth. The controller bus 208 provides an interface to the cards controlled via the host controller 104, such that the host device 102 may interact with the controller 104 to access a plurality of associated SD cards. In an implementation, a single controller bus 208 simultaneously connects a plurality of SD cards to the host controller 104 via one or more circuits 110.

In the illustrated implementation of system 200, host controller 104 includes circuits 110 configured to connect three SD cards including an SD memory 106(1), and two SDIO devices 108(1), 108(2). For instance, the circuits 110 may correspond to three card slots each configured to receive one or more types of expansion card including SD cards. A variety of other arrangements are also contemplated, including a fewer or greater number of cards/slots, multi-card slots which are operable with multiple card types (e.g., SD, Compact Flash (CF), etc.), slots operable with both an SD memory 106 and SDIO device 108, and so forth.

Circuits 110 may also be configured to switch between the plurality of SD cards (e.g., to select and deselect cards). As previously described, the switching control module 112 represents functionality that is operable to switch the circuits 110, which may be implemented in a variety of ways. For instance, switching control module 112 is depicted as executing on via host controller 104 to provide access to different SD cards at different times though switching of circuits 110. Alternatively, switching control module 112 may be implemented as a sub-module of the manager module 114 which may be executed via the microcontroller 202.

A variety of applications 116 are depicted as being provided by the microcontroller to interact with SD Cards connected to the host device 102 via the host controller 104, such as to access data, store data and so forth. For instance, a photo viewer application may receive photo data from SD memory card 106(1) such as to display a photo slide show. In another example, a browser application may receive data sufficient to render web pages from an SDIO device 108(1) configured as a wireless network interface card. A variety of SD memory 106(*n*) and SDIO devices 108(*m*) are contemplated, including but not limited to memory cards of varied capacity, network interface cards, wireless interface cards, modems, global positioning satellite, television tuners, speakers, printers, camera, scanner, voice recorder, projectors, and combinations thereof. Thus, applications 116 may be configured in a variety of ways to provide interactions with one or more associated cards.

Circuits 110 are further depicted as including a multiplex 210 portion such that multiple cards may be connected to a single bus 208 of the host controller. Further, FIG. 2 depicts an interrupt isolation 212 portion which is configured to prevent interrupt signals of multiplexed SDIO devices (or other interrupt signals of deselected devices) from corrupting operations of a selected card. Thus, circuits 110 and corresponding devices may be configured to use an interrupt isolation 212 portion to selectively isolate interrupt signals of SDIO devices inserted into one or more respective slots associated with circuits 110 and/or devices. Exemplary circuits and techniques illustrating the multiplex 210 and interrupt isolation 212 portions in greater detail may be found in relation to the following discussion of FIGS. 3-6.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware or a combination thereof. In the case of a software implementation, the module, functionality, or logic represents program code that performs specified tasks when executed on a processor (e.g., CPU or CPUs such as the microcontroller 202, or host controller 104 of FIG. 2). The program code can be stored in one or more computer readable memory devices, e.g., memories which may be integrated with controllers 202, 104. The features of the techniques to provide circuits with interrupt isolation described below are platform-independent, meaning that the techniques may be implemented on a variety of commercial computing platforms having a variety of processors.

Exemplary Circuits

Figure 3A:
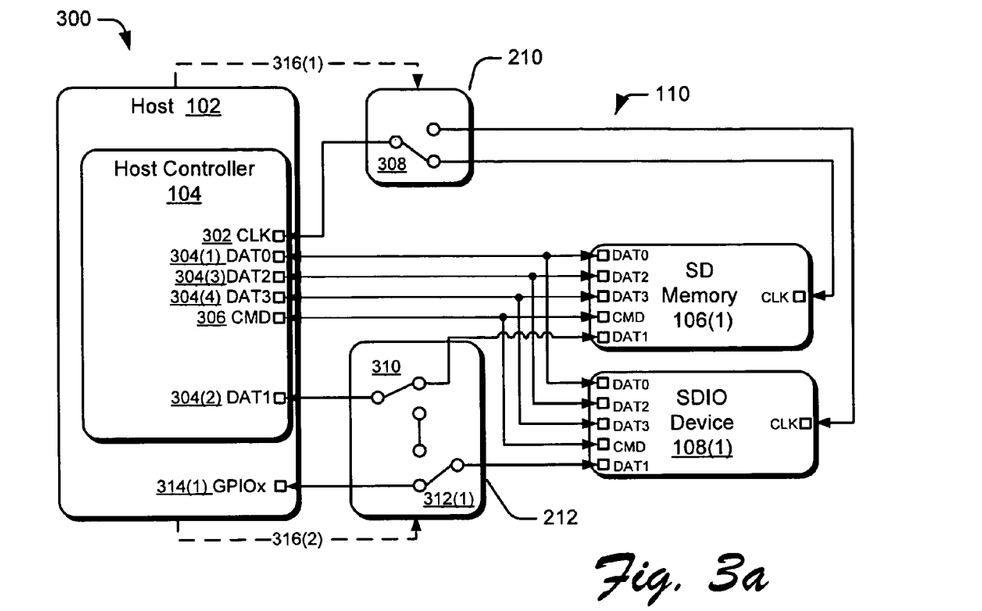
FIGS. 3a-3b depict an exemplary implementation of host controller circuit configured to simultaneously connect and switch between at least a memory card and an input/output device.
Figure 3B:
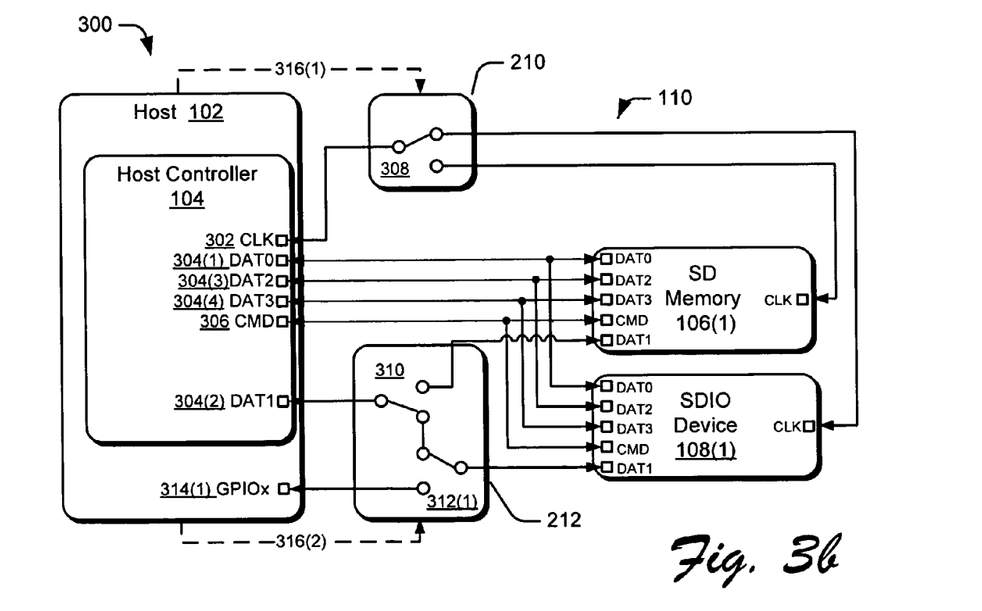

FIGS. 3*a* and 3*b* depict an exemplary implementation 300 of circuits 110 of a host controller operable to connect to and switch between a plurality of SD cards. The host controller 104 of FIGS. 3*a* and 3*b* is depicted as implemented internally within a host device 102. Alternatively, an external host controller 104 may be used. The circuits 110 is illustrated as simultaneously connectable to one SD memory 106(1) and to one SDIO device 108(1) which may therefore be enabled together via a single bus 208. Thus, the circuits 110 may for example correspond to a SD card interface having two card connections or slots. FIG. 3a depicts the SD memory card 106(1) as selected and the SDIO device 108(1) as deselected, and vice versa in FIG. 3b.

It is noted that the illustration depicts a four bit SD mode, e.g., having four data signals for the circuits 110, cards 106, 108, controller 104 and so forth. Those skilled in the art will appreciated that four bit SD cards typically have nine pins and/or signal lines. For instance, the host controller 104 and circuits 110 as depicted in FIG. 3a include signal lines associate with a clock (CLK) 302 signal, four data signals 304(1)-304(4) (e.g., DAT0, DAT1, DAT2, DAT3) and a command (CMD) 306 signal. Additional signals for power (typically 2 lines) and grounding are omitted for clarity. DAT0 304(1), DAT2 304(3), DAT3 304(4) and CMD 306 are wired in common to both cards 106(1), 108(1). CLK 302 is routed through a multiplex 210 portion. DATA 1 304(2) is routed through an interrupt isolation 212 portion. Signal lines from the host controller 104 are generally connected to corresponding data pins of respective cards, e.g. CMD to CMD, DAT1 to DAT1, and so forth. Those skilled in the art will appreciate that the techniques described herein are equally applicable to a one bit mode which is substantially the same except that two data lines, such as DAT2 304(3) and DAT3 304(4) are deactivated, disconnected, omitted, or otherwise not used.

In reference to the implementation 300 of FIGS. 3a and 3b below, various switches are described as a tangible example of an arrangement for the circuits 110 in accordance with the principles described herein. Those skilled in the art will appreciate that a variety of suitable arrangements of switches and/or other devices operable to multiplex and isolate signals may be employed in the alternative or in addition to those depicted without departing from the spirit and scope thereof. In general, a plurality of SD cards may be connected to a host device 102 via a single bus 208 utilizing circuits 110 having a multiplex 210 portion and/or an interrupt isolation 212 portion which each may be configured in a variety of ways. Thus, the multiplex portion 210 and interrupt isolation 212 portion represent functionality respectively to form the interconnections and selection of each card and to isolate interrupt signals of one or more deselected cards (e.g., SDIO 108 devices) from a selected card, and are not intended to be limited by the particular arrangements or devices depicted.

As illustrated in FIG. 3a multiplex 210 portion includes at least one switch 308 which is operable to alternately between SD memory and SD device. A multiplex arrangement is shown in which the clock signal 302 is multiplexed. Those skilled in the art will appreciate that a variety of multiplex techniques to connect a plurality of SD cards (e.g., interfaces or slot for cards) to a single bus 208 may be employed, some examples of which include multiplexing of the clock pins as illustrated, multiplexing of the command (CMD) pin and multiplexing of both the command and data lines. While clock multiplexing is depicted herein, it is contemplated that the described techniques may be employed with any suitable multiplexing arrangement.

Interrupt isolation 212 portion includes at least one switch 310 which is operable to switch the connection of the data line corresponding to the data signal on which SDIO device interrupt signals are carried between SD memory 106(1) and SDIO device 108(1). Typically, SDIO devices 108 employ interrupts to alert the host device 102 and/or controller 104 to attend to the SDIO device 108, such as when data is ready to transferred, an event occurs, an error occurs and so forth. In traditional arrangements the DAT1 signal is used for these interrupts of SDIO devices 108. Thus, the switch 310 is operable to connect the DAT1 304(2) pin of the host controller 104 to either memory 106(1) or SDIO device 108(1).

When multiple cards are wired via a single bus 208 of a host controller 104, the interrupt of a deselected card may interfere or corrupt the activity and/or data transfer of a selected card, such as corrupting a read write to a selected memory card. If the interrupt is not monitored (such as by disconnecting entirely), then the host may not be able to attend to the SDIO card when an interrupt occurs. Thus, the traditional arrangement may fail when SD memory 106 is used with SDIO devices 108 or when multiple SDIO devices 108 are used with a single bus 208. Individual busses for each card may be used, however, this may unfavorably increase the amount of wiring, the space, and the cost for a host controller.

Accordingly, another switch 312(1) is introduced which is operable to isolate the interrupt signal of the SDIO device 108(1) when it is deselected. In an implementation, the interrupt may be routed by switch 312(1) via a general purpose input output (GPIOx) 314(1) pin associated with the host device 102. GPIOx 314(1) may be an existing pin/signal line of a host device 102, or microcontroller 202 which may be enlisted for the described interrupt isolation techniques. GPIO pins are a convenient choice for the interrupt isolation since the pins already exist and are suitable for monitoring for interrupts. Thus, using existing GPIO pins may simplify the design of a host controller 104 and/or associated circuits 110. Alternatively, a dedicated signal line designed specifically for the interrupt isolation and incorporated with a host device 102, a microcontroller 202 or even directly with the host controller 104 may be employed. Commands represented by lines 316(1) and 316(2) such as from the switching control module 112 may be communicated to cause operation of the multiplex 210 and interrupt isolation 212 portions respectively, such as to switch the circuits 110 between the configurations of FIGS. 3a and 3b.

In FIG. 3a the SD memory card 106(1) is selected. Thus, switch 308 of multiplex portion 210 is positioned such that the clock signal 302 is routed between the host 102 and the SD memory card 106(1). Further, in the interrupt isolation 212 portion, switch 310 is positioned such that DAT1 304(2) is routed between the host 102 and the SD memory card 106(1). Switch 312(1) is positioned such that the corresponding DAT1 signal of SDIO device 108(1) (which is also used for interrupts) is routed to GPIOx 314(1) of the host device. Thus, the interrupt of the deselected SDIO device 108(1) is isolated and may be monitored via the GPIOx 314(1), such as via manager module 114, switching control module 112, or other suitable monitoring.

Referring now to FIG. 3b, the circuits 110 are set to select the SDIO device 108(1). Thus, switch 308 is positioned to route the clock 302 signal between the host device 102 and the SDIO device 108(1), and switches 310 and 312(1) are positioned to connect the DAT1 304(2) signal between the host device 102 and SDIO device 108(1). Thus, the interrupt of the SDIO device 108(1) when selected may be monitored via the DAT1 304(2) pin of the host controller 104.

As illustrated in FIG. 3b, the DAT1 line corresponding to the memory card 106(1) is not connected to the host 102 or controller 104 when the memory card is deselected. Those skilled in the art will appreciate that SD memory typically does not use interrupts, thus in addition to a slot configured to isolate an interrupt of an SDIO device 108(1), a device may include dedicated SD memory slots which disconnect the DAT1 signal rather than isolate the line when the corresponding card is disconnected. In an implementation, each card slot may be configured to interchangeably accept SDIO devices 108 and SD memory 106. Thus, the memory card 106(1) in FIG. 3b could be replaced with another SDIO device 108(m). To handle the interrupts in this implementation, circuits 110 may be configured to isolate a signal corresponding to DAT1 pin 304(2) for each card slot when the slot and associated card are deselected. The type of card used in a slot may be detected and when SD memory 106 is used in an SDIO capable slot (e.g., a slot capable of isolating interrupts when the associated card is deselected), the corresponding isolation device (e.g., switch 312(1) here) may be deactivated. Alternatively, to simplify the circuits 110 and operation of interrupt isolation 212, the interrupt isolation (e.g., connecting a DAT1 line to GPIOx 314(1)) may occur for each SD card used in a slot even though some cards (memory) may not employ interrupts. Naturally, when multiple SDIO capable slots are employed, multiple GPIO pins corresponding to each SDIO capable slot may also be employed, further discussion of which may be found in relation to FIG. 4.

Figure 4:
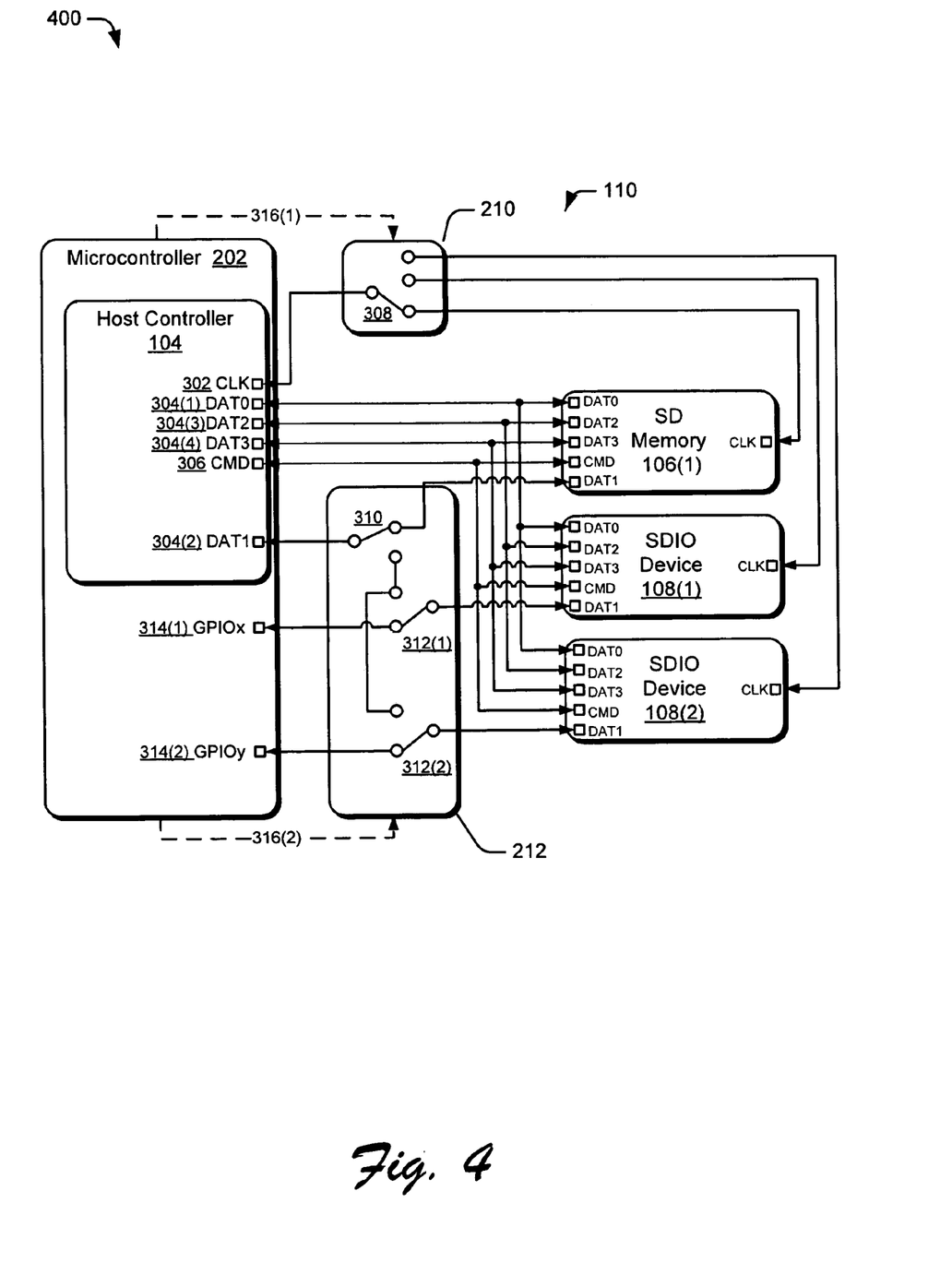
FIG. 4 is another exemplary implementation of a host controller circuit configured to simultaneously connect and switch between a plurality of expansion cards including two or more input/output devices.

FIG. 4 depicts an implementation 400 of circuits 110 in which multiple SDIO devices 108 may be simultaneously connected to a host device 102, such that the interrupt of each deselected SDIO device 108 is isolated via the isolation portion 212. More particularly, the circuits 110 in FIG. 4 correspond to a secure digital SD card interface having at least three card connections and/or slots. A variety of other arrangements are contemplated in which a fewer or greater number of connections for SD cards are provided. The host controller 104 in FIG. 4 is implemented as an embedded portion of a microcontroller 202.

FIG. 4 depicts circuits 110 configured such that the SD memory card 106(1) is selected and the SDIO devices 108(1), 108(2) are deselected. The switch 308 in this implementation is positionable to direct the clock signal 302 between each slot and/or card, e.g., to alternately select between SD memory 106(1) and SDIO devices 108(1), 108(2). Similarly, switch 310 is positionable to alternately route DAT1 304(2) of the host controller 104 to SD memory 106(1) and SDIO devices 108(1), 108(2). The interrupt isolation 218 portion is depicted as having a pair of switches 312(1) and 312(2), operable to isolate interrupt signals from respective SDIO devices 108(1), 108(2). The switches 312(1) and 312(2) correspond respectively to general purpose input output pins GPIOx 314(1) and GPIOy 314(2) which are provide via the microcontroller 202. The switches 310, 312(1) and 312(2) may be operated to selectively route the DAT1 304(2) signal line to each connected card 106(1), 108(1) and 108(2). In an implementation, the interface or card slot corresponding to the SD memory card 106(1) in FIG. 4 may also be configured to support an SDIO device 108(m) and accordingly, when the corresponding card is deselected, the slot may be connected to one of the GPIO pins 314(1), 314(2) or to another GPIO pin of the microcontroller 202. When the SDIO devices 108(1), 108(2) are not selected, the interrupt of the deselected SDIO devices 108(1), 108(2) may be monitored (such as by manager module 114) without the occurrence of an interrupt corrupting or interfering with DAT1 304(2) signals between the host device 102 and the selected card, e.g., the memory card 106(1). Thus, multiple SDIO devices 108(m) may be simultaneously connected to a host device 102 such that the interrupt of each deselected SDIO device 108(m) is isolated via the isolation portion 212.

Exemplary Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the systems and devices of FIGS. 1-4.

Figure 5:
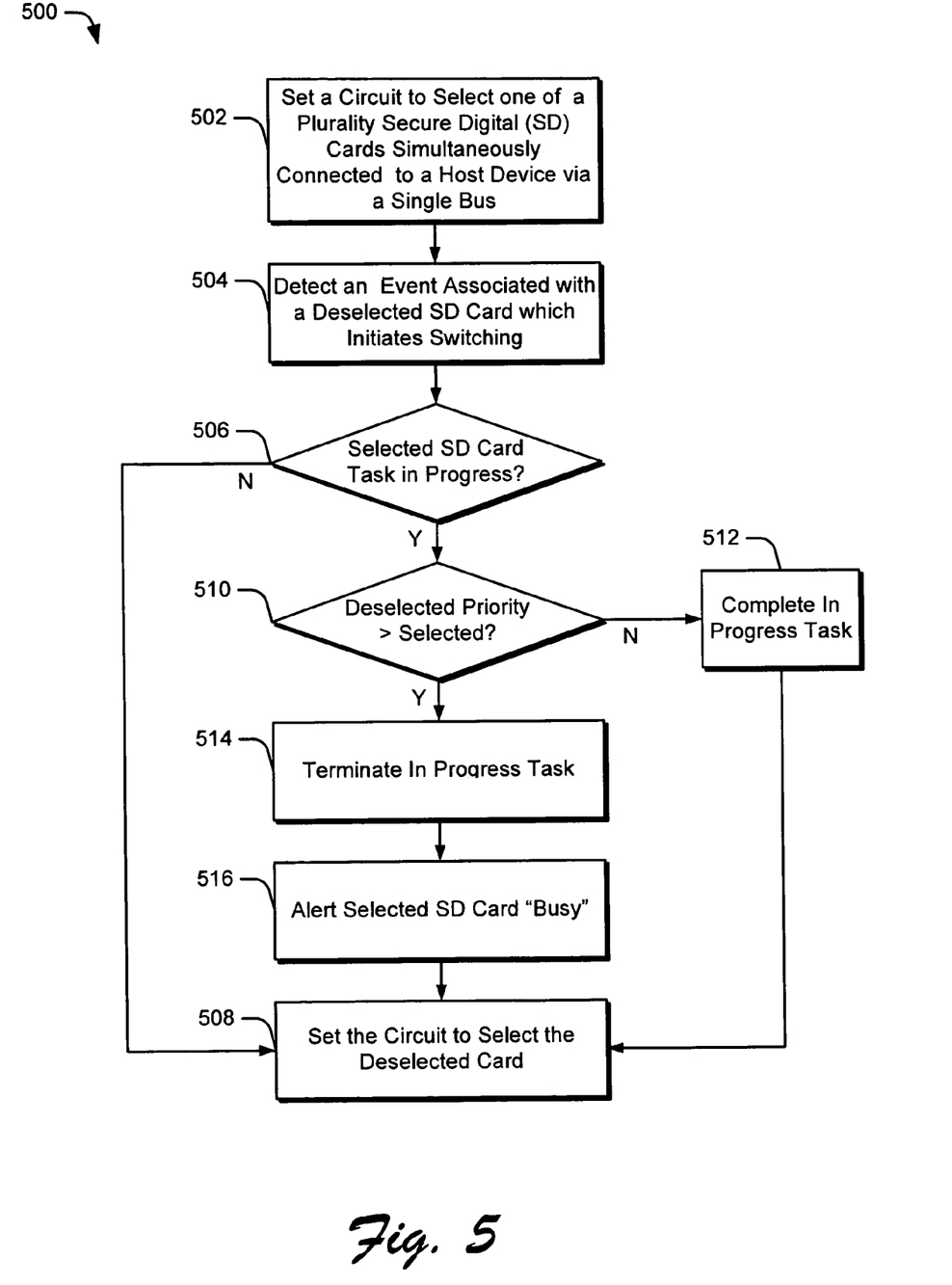
FIG. 5 is a an exemplary implementation of an exemplary procedure in which a host controller circuit in accordance with one or more embodiments is used to switch between a plurality of cards.

FIG. 5 depicts a procedure in which the switching occurs between a plurality SD cards simultaneously connected to a host device via a single bus. In an implementation, the host device includes at least one slot interconnected via the single bus which is configured to connect an SDIO device and to isolate associated interrupt signals when the SDIO device is deselected. Further, the switching may be performed based on a comparison of the priority of the tasks between two SD cards. The procedure may for example be employed to move back and forth between the circuit configurations depicted in FIGS. 3a and 3b, as well as between different configurations of other circuits, such as the circuit depicted in FIG. 4. In other words, the described procedure may be employed to select between an SD memory card 106(1) and an SDIO device 108(1), between two memory cards 106(n) and/or between two SDIO cards 108(m) which are simultaneously connected to a host controller 104 via a single bus 208.

A circuit is set to select one of a plurality of secure digital cards simultaneously connected to a host device via a single bus (block 502). For the purposes of example assume that a host controller 104 has circuits 110 operable to connect at least an SD memory card 106(1) and an SDIO device 108(1) as depicted in FIG. 2. Naturally, one or more additional cards may also be simultaneously connected such as SDIO device 108(2) in FIG. 2. Further, assume that the SD memory card 106(1) holds digital images which a user of host device 102 may attempt to transfer, view and/or edit via an application 116 (e.g., photo management application) of the host device 102. Additionally, the SDIO device 108(1) may be configured as a wireless internet networking card which may provide data sufficient to render and/or display web pages to a communication application 116 (browser) of the host device 102. A variety of other examples are contemplated in which SD memory card 106(1) and an SDIO device 108(1) may hold a variety of data and/or provide a variety of functionality.

The host controller 104 as is shown in FIG. 2 may include a single bus 208 which provides the connections to each of a plurality of cards. The host controller 104 may further interconnect the controller bus 208 to a host bus or system bus 206, such that the host device 102 and applications 116 may interact with the connected cards. Switching control module 112 may be executed by the host controller 104 to set the position of circuits 110, such as in response to an initialization sequence, a read or write (r/w) command from the photo management application 116 and so forth. Thus, host controller 104 via the switching module 112 may set the configuration of circuits 110 such that the memory card 106(1) is selected and the SDIO device 108(1) is deselected as in FIG. 3a. In this setting, the photo management application 116 may read/write (r/w) to the card 106(1) to interact with the digital image data. The DAT1 connection of the SDIO card 108(1) in this configuration of circuits 110 is isolated via GPIOx pin 314(1) of the host device 102. Thus, the r/w actions (transfer of digital image data) between the host 102 and the memory card 106(1) will not be corrupted by interrupts of the SDIO device 108(1), and the GPIOx pin 314(1) may be monitored to detect an interrupt signal of the SDIO device 108(1), such as by the manager module 114.

An event associated with a deselected card is detected which initiates switching (block 504). For example, the switching module 112 and/or manager module 114 may provide functionality to monitor for events associated with deselected cards. A variety of events are contemplated which may be configured to initiate switching between a selected card and the deselected card including but not limited to interrupts from SDIO devices, read/write commands from an application 116 attempting to access a deselected memory card, various card and/or application errors, and so forth. Generally, a detected event signals the host device 102 and/or controller 104 to select the associated card in order to address a problem, to transfer data, or otherwise process the detected event.

Continuing with the previous example, an interrupt may be generated by the wireless networking card (SDIO 108(1)) when a wireless internet access point is discovered. The interrupt is routed via the isolated signal line including the GPIOx pin 314(1) and may be detected by the manager module 114 of host device 104. Thus, the detected interrupt may initiate switching to the deselected card to configure a connection to wireless internet access point. In other instances, an attempt by an application 116 to read or write (r/w) to a deselected memory card 106 may be detected which initiates switching to the memory card 106.

In response to the detected event, a determination is made whether a task is in progress for the selected SD card (block 506). Continuing the previous example, when an interrupt from the wireless networking card (SDIO 108(1)) is detected, the switching control module 112 determines if data transfer or other processing is in progress for the selected memory card 106(1), such as a transfer of a digital image between the application 116 and the card 106(1).

When a task is not in progress, then the circuit is set to select the deselected card (block 508). For instance, if the selected memory card 106(1) is idle (no activity) when the interrupt is detected, the switching control module 12 may control circuits 110 to select the wireless networking card, e.g., SDIO 108(1). In particular, control signals 316(1), 316(2) may be communicated to the multiplex 210 and interrupt isolation 212 portions to toggle the circuits 110 from the configuration depicted in FIG. 3a (memory card 106(1) selected) to the configuration depicted in FIG. 3b (SDIO 108(1) selected). Notably, the DAT1 connection previously isolated via GPIOx pin 314(2) is now connected to the 304(2) pin of the host controller. Thus, the signal on which interrupts of a SDIO device 108(1) are communicated may alternately be connected to the active signal path of host controller 104 when the SDIO device 108(1) is selected and isolated via a in interrupt isolation 212 portion when, the, SDIO device 108(1) is deselected. In implementations in which a plurality of SDIO devices 108(m) are simultaneously connected to a host controller 104, the interrupt signal of each of SDIO device 108(m) may similarly be connected to a pin of the host controller 104 when the corresponding card is selected and isolated such as via a interrupt isolation 212 portion when the card is deselected.

When there is a task in progress, then priority-based switching may occur. The priority of the deselected card task is compared to in progress task for the selected card to determine the highest priority (block 510). For instance, switching control module 114 may reference priorities assigned to cards and/or to tasks to determine whether the switching should occur right away, or after in progress activity is completed. It is contemplated that priority may be assigned in a variety of ways such as on the basis of the task being performed, the type of card or device, the particular application using the card, and so forth. For example, a network card device may be assigned a higher priority than a memory card. An entertainment application 116 such as a multimedia player may be assigned a lower priority than a system application 116 such as a program installer even if they access the same memory card 106. Further, these priorities may be set by default and/or may be configurable such as by an administrator, a user and so forth.

When the in progress task is highest in priority, the in progress task is completed (block 512) prior to switching to the deselected task. When the task is completed, the circuit is set to select the deselected card (block 508) as previously described. However, when the deselected card task has the highest in priority, then the in progress task is terminated (block 514). To prevent adverse results such as corrupted data, the termination may occur at a clean or logical stopping point such as after transfer of a current block of data. Optionally, a "busy" alert message may be formed and/or communicated to the selected card (the active card) or associated application (block 516). For instance, the application operating a memory card 106(1) may be alerted or in the case of a SDIO device 108(1) being the currently selected card, the SDIO device may be alerted. Then, the circuit is set to select the deselected card (block 508) as previously described.

Optionally, the current in progress task (e.g., of the selected card) may always be completed first and/or be assigned a higher priority and thus the priority determination may be omitted. In this implementation, when there is an in progress task determined (block 506), the task is completed (block 512) and then the circuit is set to select the deselected card (block 508).

Exemplary System

Figure 6:
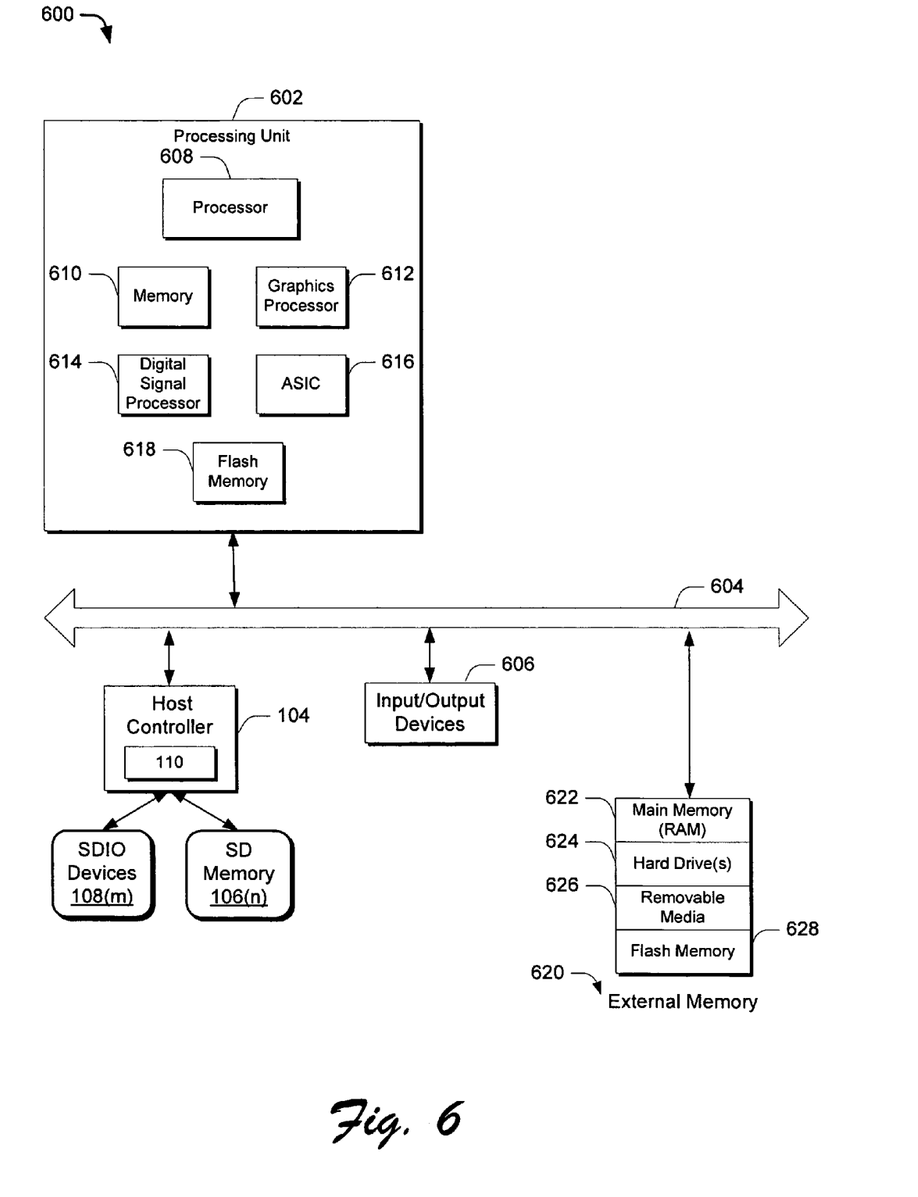
FIG. 6 depicts a system in which is operable to employ host controller circuits in accordance with one or more described embodiments.

Referring to FIG. 6, a block diagram of an exemplary implementation 600 of an electronic system is depicted that may include one or more circuits 110 with multiplex 210 portion operable to connect to and select between a plurality of SD cards and having interrupt isolation 212 portions to isolate SDIO device 108(m) interrupts in accordance with the principles described herein. Such an electronic system may comprise a computer system that includes a processing unit 602 which is electrically coupled to various components in electronic system 600 via a system bus 604. System bus 604 may be a single bus or any combination of busses. A variety of electronic systems are contemplated including but not limited to mobile phones, handheld computing devices, digital cameras, multimedia players, laptops, digital media recording devices, personal computers, printers and so forth. The processing unit 602 may be configured in variety of ways such as a general purpose processing unit, a chipset, a microcontroller, and so forth. Additionally, a host controller 104 may be connected to the system 600 via the bus 604. The host controller 104 is operable to simultaneously connect a plurality of SD cards including SD memory 106(n) and SDIO device 108(m) via a single bus. The host controller 104 is configured to employ circuits 110 having previously described interrupt isolation 212 portions to isolate interrupts of SDIO devices 108(m) when connected via the host controller 104.

Further, the electronic system 600 may also include a one or more input/output devices 606 which may include but are not limited to a display device, speakers, a keyboard, a mouse, a trackball, a game controller, a microphone, a voice-recognition device, or any other device that inputs and outputs information in the electronic system 600. The input devices 606 may be operably coupled to the bus 604 to provide inputs/outputs for interaction of a user with the system 600, such as to direct a processor 608 and/or one or more application modules executable on the processor 608, and to output results.

Processing unit 602 can include, among other components, one or more processors 608, memory 610 which may be a "main memory" of the host device, configured as dynamic random access memory (DRAM) or other suitable memory, a graphics processor 612 or a digital signal processor 614, and/or a custom circuit or an application-specific integrated circuit 616, such as a communications circuit for use in wireless devices such as cellular telephones, pagers, portable computers, two-way radios, and similar electronic systems and a flash memory device 618. Processing unit 602 may also include an imbedded host controller 104 constructed in accordance with the described techniques, which is associated with the processing unit 602 and/or components of the processing unit 602, such as an embedded controller circuit.

The electronic system 600 may also include an external memory 620 that in turn includes one or more memory elements suitable to the particular application, such as a main memory 622 in the form of random access memory (RAM), one or more hard drives 624, and/or one or more drives that handle removable media 626, such as floppy diskettes, compact disks (CDs) and digital video disks (DVDs). In addition, such external memory may also include a flash memory device 628.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary

What is claimed is:

1. An apparatus comprising:
   a plurality of secure digital input output (SDIO) device card slots, wherein an SDIO card slot comprises a slot capable of isolating interrupts when the associated card is deselected;
   a bus of a host controller to simultaneously connect a plurality of expansion cards to a host device via the plurality of SDIO device card slots, wherein the plurality of expansion cards includes at least a secure digital (SD) memory card and a secure digital input output (SDIO) device;
   a multiplex portion which is operable to select one of the plurality of expansion cards such that the host device may interact with the selected card via the host controller, wherein the multiplex portion:
      includes one or more switches operable to select one of the multiplexed expansion cards; and
      is configured to multiplex between the host controller and the plurality of expansion cards via a clock pin:
   an interrupt isolation portion of the host controller configured to:
      connect an interrupt signal associated with at least one expansion card via the bus when the expansion card is selected; and
      isolate the interrupt signal from the bus when the at least one expansion card is deselected;
   when the SD memory card is selected:
      the interrupt signal of the SDIO device is routed via a general purpose input output (GPIO) pin of the host device, wherein the GPIO pin of the host device is isolated from the host controller; and
      the interrupt isolation portion of the host controller associated with an SDIO device card slot employed to connect the SD memory card is deactivated; and
   when the SDIO device is selected the interrupt signal is routed via a data pin of the host controller.

2. An apparatus as in claim 1, wherein the secure digital input output (SDIO) devices are selected from the group consisting of a network interface, a wireless interface, a modem, global positioning satellite (GPS) device, a television tuner, speakers, a printer, a camera, a scanner, a voice recorder, and a projector.

3. An apparatus as in claim 1, wherein:
   the interrupt signal is to be communicated via a data pin of a corresponding said expansion card; and
   the interrupt isolation portion includes one or more switches operable to:
      route the interrupt signal from the data pin to a corresponding data pin of the host controller when the corresponding said expansion card is selected; and
      route the interrupt signal from the data pin on a path isolated from the corresponding data pin of the host controller when the corresponding said expansion card is deselected.

4. An apparatus as described in claim 3, wherein:
   when the corresponding said expansion card is selected, the interrupt signal is to be monitored via the corresponding data pin of the host controller; and
   when the corresponding said expansion card is deselected, the interrupt signal is to be monitored via the isolated path such that the occurrence of an interrupt when the corresponding said expansion card is deselected does not interfere with communication between the host controller and a selected said expansion card via the corresponding data pin of the host controller.

5. An apparatus as described in claim 1, wherein the host controller is embedded in a microcontroller of the host device.

6. An apparatus as described in claim 1, wherein the interrupt isolation portion is to route the interrupt signal of an expansion card such that the interrupt signal is to be monitored via the bus when the expansion card is selected and via a signal path distinct from the bus when the expansion card is deselected.

7. An apparatus as described in claim 1, wherein the host controller is to connect a selected expansion card to a system bus of the host device to permit interaction of the host device with the selected card.

8. An apparatus as described in claim 1, wherein the interrupt isolation portion is to selectably switch the interrupt signal between a data pin of the host controller when the card is selected and a general purpose input output pin (GPIO) of the host device when the card is deselected.

9. An apparatus as described in claim 1, wherein:
   the plurality of expansion cards includes at least two secure digital input output (SDIO) devices simultaneously connected to the host device via the bus; and
   the interrupt signal of each SDIO device is routed via a data pin of the host controller when the corresponding SDIO device is selected and is isolated from the bus when the corresponding SDIO device is deselected.

10. An apparatus as described in claim 1, wherein the interrupt signals are transmitted via a data pin of the at least one expansion card which correspond to a data pin of the host controller.

* * * * *